United States Patent
Jo

(10) Patent No.: US 11,245,874 B2
(45) Date of Patent: Feb. 8, 2022

(54) DISPLAY SYSTEM OF VEHICLE AND METHOD OF DRIVING THE SAME

(71) Applicant: MANDO CORPORATION, Pyeongtaek-si (KR)

(72) Inventor: Min-Gwan Jo, Seoul (KR)

(73) Assignee: Mando Corporation, Pyeongtaek-si (KR)

( * ) Notice: Subject to any disclaimer, the term of this patent is extended or adjusted under 35 U.S.C. 154(b) by 0 days.

(21) Appl. No.: 15/914,296

(22) Filed: Mar. 7, 2018

(65) Prior Publication Data
US 2018/0262719 A1    Sep. 13, 2018

(30) Foreign Application Priority Data
Mar. 7, 2017    (KR) .................. 10-2017-0029043

(51) Int. Cl.
*H04N 7/18* (2006.01)
*H04N 5/247* (2006.01)
(Continued)

(52) U.S. Cl.
CPC .............. *H04N 7/181* (2013.01); *B60R 1/00* (2013.01); *G06F 3/1423* (2013.01);
(Continued)

(58) Field of Classification Search
CPC .............. H04N 7/181; H04N 5/23293; G06K 9/00597; G06K 9/00845; B60R 2300/20; B60R 1/00; B60R 2300/105; G06F 3/1423

See application file for complete search history.

(56) References Cited

U.S. PATENT DOCUMENTS

| 5,289,321 A * | 2/1994 | Secor | B60K 35/00 359/896 |
| 6,216,989 B1 * | 4/2001 | Shioya | F16M 11/10 248/122.1 |

(Continued)

FOREIGN PATENT DOCUMENTS

| CN | 102639363 A | 8/2012 |
| DE | 102013202219 A1 | 8/2014 |

(Continued)

OTHER PUBLICATIONS

Office Action dated Nov. 3, 2020 in Chinese Patent Application No. 2020102902407870.

(Continued)

*Primary Examiner* — Shawn S An
(74) *Attorney, Agent, or Firm* — Morgan, Lewis & Bockius LLP

(57) ABSTRACT

Disclosed herein are a display system of a vehicle and a method of driving the same. The display system includes a plurality of camera modules configured to capture a front side, a rear side, a rear left side, and a rear right side relative to the vehicle and generate image data, a plurality of display panels configured to receive the image data and display front side images, rear side images, rear left side images, and rear right side images relative to the vehicle, a driver pupil detection sensor configured to sense a pupil of a driver and generate pupil position data, a driver posture detection sensor configured to sense a position of the driver, a body direction thereof, and a head height thereof and generate posture data, a calculator configured to calculate a position of a field of view of the driver on the basis of the pupil position data and the posture data and generate a display correction value on the basis of the position of the field of view, and a display correction device configured to adjust a (Continued)

horizontal tilt and a vertical tilt of each of the plurality of display panels on the basis of the display correction value.

12 Claims, 7 Drawing Sheets

(51) Int. Cl.
*B60R 1/00* (2022.01)
*G06F 3/14* (2006.01)
*G06K 9/00* (2022.01)
*H04N 5/232* (2006.01)

(52) U.S. Cl.
CPC ..... *G06K 9/00597* (2013.01); *G06K 9/00845* (2013.01); *H04N 5/23293* (2013.01); *H04N 5/247* (2013.01); *B60R 2300/105* (2013.01); *B60R 2300/20* (2013.01); *B60R 2300/306* (2013.01); *B60R 2300/70* (2013.01); *B60R 2300/8046* (2013.01); *G09G 2320/0261* (2013.01); *G09G 2354/00* (2013.01); *G09G 2380/10* (2013.01)

(56) References Cited

U.S. PATENT DOCUMENTS

| | | | |
|---|---|---|---|
| 9,158,962 B1* | 10/2015 | Nemat-Nasser ... | G06K 9/00845 |
| 2002/0175564 A1 | 11/2002 | Tengler et al. | |
| 2003/0209893 A1* | 11/2003 | Breed ................. | B60N 2/0248 |
| | | | 280/735 |
| 2007/0106182 A1* | 5/2007 | Arnett ................. | A61B 5/1077 |
| | | | 600/587 |
| 2008/0023946 A1* | 1/2008 | Haag ................. | B60R 21/01554 |
| | | | 280/735 |
| 2010/0066832 A1* | 3/2010 | Nagahara ............ | G02B 7/1822 |
| | | | 348/148 |
| 2012/0133768 A1* | 5/2012 | Stephan .................. | B60R 1/00 |
| | | | 348/148 |
| 2014/0097748 A1 | 4/2014 | Kato | |
| 2014/0222253 A1* | 8/2014 | Siegel .................. | B60W 50/08 |
| | | | 701/2 |
| 2014/0276090 A1* | 9/2014 | Breed ...................... | A61B 5/18 |
| | | | 600/473 |
| 2015/0258892 A1* | 9/2015 | Wu ...................... | G06K 9/0061 |
| | | | 340/576 |
| 2015/0296135 A1* | 10/2015 | Wacquant .......... | G06K 9/00261 |
| | | | 348/207.11 |
| 2016/0120309 A1* | 5/2016 | Brandt ................. | A47B 81/062 |
| | | | 361/679.01 |
| 2016/0139409 A1 | 5/2016 | Graf et al. | |
| 2017/0080864 A1* | 3/2017 | Schwartz ............... | G05G 9/047 |
| 2017/0096168 A1* | 4/2017 | Yang ...................... | B62D 15/0285 |
| 2017/0210357 A1* | 7/2017 | Nagai ...................... | B60T 7/14 |
| 2018/0122312 A1* | 5/2018 | Niu ...................... | G09G 3/2003 |
| 2018/0334102 A1* | 11/2018 | Zafeirakis ......... | B60R 21/01552 |
| 2019/0253603 A1* | 8/2019 | Miyagaki ................ | H04N 17/00 |

FOREIGN PATENT DOCUMENTS

| | | |
|---|---|---|
| DE | 102013013227 A1 | 2/2015 |
| DE | 102014016225 B4 | 5/2016 |

OTHER PUBLICATIONS

Office Action issued in corresponding German Patent Application No. 102018105169.7, dated Sep. 15, 2021.

* cited by examiner (a)

(b)

(c)

(d)

(a)

(b)

(c)

(d)

(a)

(b)

(c)

(d)

DISPLAY SYSTEM OF VEHICLE AND METHOD OF DRIVING THE SAME

CROSS-REFERENCE TO RELATED APPLICATION

This application claims the benefit of Korean Patent Application No. 2017-0029043, filed on Mar. 7, 2017 in the Korean Intellectual Property Office, the disclosure of which is incorporated herein by reference.

BACKGROUND

1. Field

Embodiments of the present disclosure relate to a display system of a vehicle and a method of driving the same, and more particularly, to a display system of a vehicle, which is capable of improving visibility of vehicle surroundings by automatically correcting a tilt of a display device configured to replace or assist a side mirror, and a method of driving the same.

2. Description of the Related Art

Generally, side mirrors for observing traffic conditions in left and right rear sides of a vehicle are installed at both outer sides of the vehicle. The side mirrors are provided to significantly protrude to the outside of the vehicle so as to ensure a sufficient view of the left and right rear sides.

Recently, a method has been proposed in that a display module such as a liquid crystal display (LCD) is additionally installed with a side mirror to display camera images. However, a conventional electric mirror system has a problem in that a display module for displaying left and right rear images captured through a camera is fixed without regard to a state of a driver thereby causing degraded visibility of vehicle surroundings.

SUMMARY

Therefore, it is an aspect of the present disclosure to provide a display system of a vehicle, which is capable of automatically correcting a tilt of a display device according to a state of a driver, and a method of driving the same.

Additional aspects of the present disclosure will be set forth in part in the description which follows and, in part, will be obvious from the description, or may be learned by practice of the disclosure.

In accordance with one aspect of the present disclosure, a display system of a vehicle includes a plurality of camera modules configured to capture a front side, a rear side, a rear left side, and a rear right side relative to the vehicle and generate image data, a plurality of display panels configured to receive the image data and display front side images, rear side images, rear left side images, and rear right side images relative to the vehicle, a driver pupil detection sensor configured to sense a pupil of a driver and generate pupil position data, a driver posture detection sensor configured to sense a position of the driver, a body direction thereof, and a head height thereof and generate posture data, a calculator configured to calculate a position of a field of view of the driver on the basis of the pupil position data and the posture data and generate display correction values on the basis of the position of the field of view, and a display correction device configured to adjust a horizontal tilt and a vertical tilt of each of the plurality of display panels on the basis of the display correction values.

The plurality of display panels may include a first display panel configured to display the front side images relative to the vehicle, a second display panel configured to display the rear side images relative to the vehicle, a third display panel configured to display the rear left side images relative to the vehicle, and a fourth display panel configured to display the rear right side images relative to the vehicle.

The display correction device may adjust the vertical tilt of each of the first to fourth display panels in an upward direction or a downward direction on the basis of the display correction values.

The display correction device may adjust the horizontal tilt of each of the first to fourth display panels in a left direction or a right direction on the basis of the display correction values.

The calculator may include a memory configured to store driver learning result data, which is obtained by learning a height, a body type, a posture, a face size, an interorbital width, and an eye shape of each of a plurality of people, and calculate an absolute position of the field of view of the driver on the basis of the learning result data.

In accordance with another aspect of the present disclosure, a display system of a vehicle includes a camera module configured to capture vehicle surroundings, a display panel configured to display images captured through the camera module, a driver pupil detection sensor configured to sense a pupil of a driver, a driver posture detection sensor configured to sense the posture of the driver, a calculator configured to calculate display correction values of the display panel on the basis of the sensed pupil of the driver and the sensed posture thereof, and a display correction device configured to adjust the horizontal tilt and the vertical tilt of the display panel according to the calculated display correction values.

In accordance with still another aspect of the present disclosure, a method of driving a display system of a vehicle, the method including sensing a pupil of a driver and generating pupil position data, sensing a posture of the driver, a body direction thereof, and a head height thereof and generating driver posture data, calculating a position of a field of view of the driver on the basis of the pupil position data and the driver posture data, generating display correction values on the basis of the position of the field of view of the driver, and adjusting the horizontal tilt and the vertical tilt of each of a plurality of display panels disposed at the vehicle on the basis of the display correction values.

The method may further include adjusting the vertical tilt of each of the plurality of display panels in an upward direction or a downward direction on the basis of the display correction values.

The method may further include adjusting the horizontal tilt of each of the plurality of display panels in a left direction or a right direction on the basis of the display correction values.

The method may further include storing driver learning result data, which is obtained by learning a height, a body type, a posture, a face size, an interorbital width, and an eye shape of each of a plurality of people, in a memory, and calculating an absolute position of the field of view of the driver on the basis of the driver learning result data.

In accordance with yet another aspect of the present disclosure, a method of driving a display system of a vehicle, the method including sensing a pupil position of a driver, sensing a posture of the driver, and adjusting at least one of a horizontal tilt and a vertical tilt of a display device on the basis of the sensed pupil position of the driver and the sensed posture thereof.

BRIEF DESCRIPTION OF THE DRAWINGS

These and/or other aspects of the present disclosure will become apparent and more readily appreciated from the following description of the embodiments, taken in conjunction with the accompanying drawings of which.

DETAILED DESCRIPTION

Figure 1:
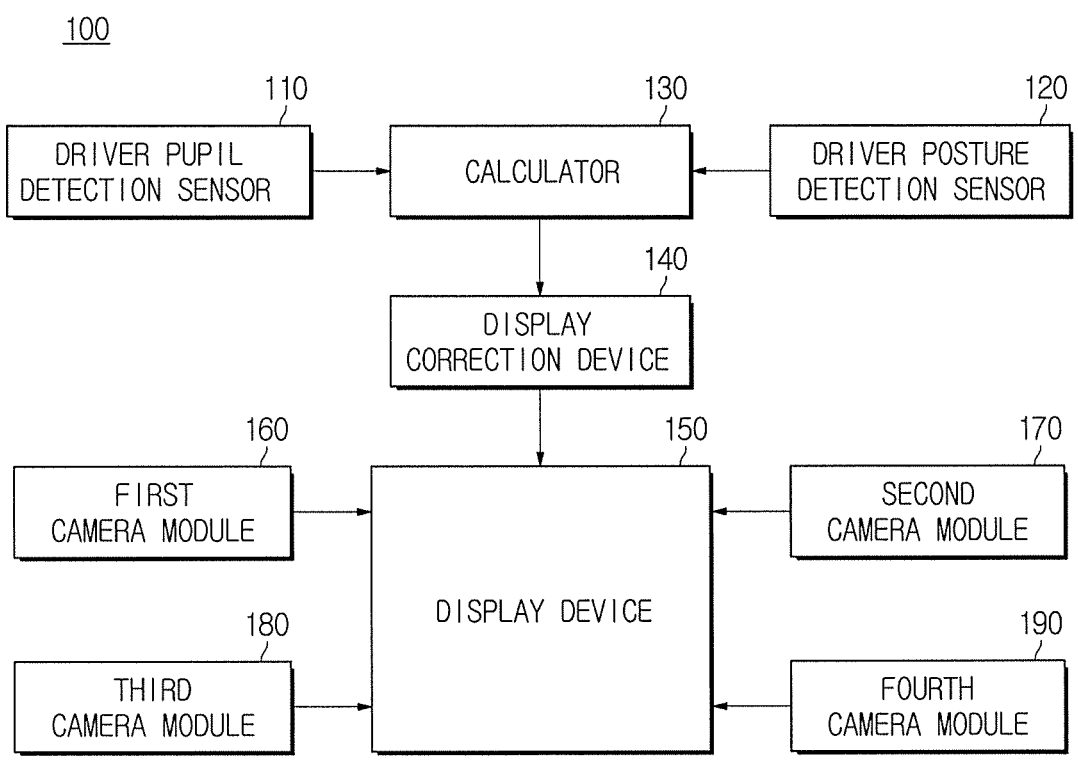
FIG. 1 is a diagram illustrating a display system of a vehicle according to an embodiment of the present disclosure.

Hereinafter, embodiments of the present disclosure will be fully described in a detail which is suitable for implementation by those skilled in the art with reference to the accompanying drawings. The present disclosure may be implemented in various different forms, and thus it is not limited to embodiments which will be described herein.

In order to clearly describe the present disclosure, some portions not related to the description will be omitted and not be shown, and the same reference numerals are given to the same or similar components throughout the disclosure.

Throughout the disclosure, when a portion is referred to as being "connected to" another portion, this includes a case in which the portion is "directly connected to" another portion as well as a case in which the portion is "electrically connected to" the other portion by interposing another element therebetween. Further, when a component is referred to as being "included in" a portion, this does not mean that the component is excluded, but rather that other components are contained therein.

When a portion is referred as being "on" other portion, the portion may be directly on the other portion or another portion may be interposed therebetween. Contrarily, when a portion is referred to as being "directly above" other portion, another portion is not interposed therebetween.

Terms first, second, and third, and the like are used to describe various portions, components, regions, layers, and/or sections, but are not limited thereto. These terms are used only to distinguish a portion, a component, region, layer, or section from another portion, component, region, layer, or section. Therefore, a first portion, component, region, layer, or section, which will be described below, may be referred to as a second portion, component, region, layer, or section without departing from the scope of the present disclosure.

Technical terms used herein are intended to describe only specific embodiments and not intended to limit the present disclosure. As used herein, the singular forms include the plural forms unless the context clearly indicates otherwise. The meaning of "including" used herein is intended to specify a specific feature, region, integer, step, operation, element, and/or component, and not intended to exclude the presence or addition of other feature, region, integer, step, operation, element, and/or component.

Terms indicating a relative space, such as "below," "above," and the like, may be used to more easily describe a relationship of a portion shown in the drawing with respect to another portion. These terms include alternative meanings or operations of a device in use, as well as intended meanings thereof in the drawings. For example, when a device shown in the drawing is turned upside down, some portions described as being "below" other portions will be described as being "above" the other portions. Thus, an exemplary term "below" includes both upward and downward directions. A device can be rotated by 90° or other different angles, and thus terms indicating a relative space should be construed according to the rotation of the device.

Unless defined otherwise, all terms including technical and scientific terms used herein have the same meanings as commonly understood by those skilled in the art to which the present invention pertains. Terms being commonly used and defined in a dictionary should further be construed as having meanings consistent with the relevant technical documents and the present disclosure, and not be construed as ideal or strictly formal meanings unless defined otherwise.

Hereinafter, embodiments of the present disclosure will be fully described in a detail which is suitable for implementation by those skilled in the art with reference to the accompanying drawings. The present disclosure may, however, be implemented in various different forms, and thus it is not limited to embodiments to be described herein.

FIG. 1 is a diagram illustrating a display system of a vehicle according to an embodiment of the present disclosure.

Referring to FIG. 1, a display system 100 of a vehicle according to the embodiment of the present disclosure includes a driver pupil detection sensor 110, a driver posture detection sensor 120, a calculator 130, a display correction device 140, a display device 150, a first camera module 160, a second camera module 170, a third camera module 180, and a fourth camera module 190.

The driver pupil detection sensor 110 is disposed inside the vehicle to face a driver and detects a pupil of the driver to determine a position of the pupil. A camera may be applied as the driver pupil detection sensor 110, and the driver pupil detection sensor 110 may detect the position of the pupil by emitting infrared rays toward the pupil. Here, the driver pupil detection sensor 110 may detect each of positions of left and right pupils of the driver to generate pupil position data of the driver. The pupil position data may include pupil position, pupil coordinates, gaze, and the like on a face of the driver.

The driver pupil detection sensor 110 transmits the pupil position data to the calculator 130.

The driver posture detection sensor 120 senses a posture of the driver.

The driver posture detection sensor 120 may include a plurality of weight detection sensors disposed inside a driver seat and a camera sensor disposed ahead of the driver.

The plurality of weight detection sensors constituting the driver posture detection sensor 120 sense a weight of the driver. At this point, the posture of the driver is determined according to the weight detected by the plurality of weight detection sensor 120 disposed at different location in the driver seat. Further, the camera sensor constituting the driver posture detection sensor 120 captures the driver sitting in the driver seat, and then the driver posture detection sensor 120 senses a head height of the driver and a sitting height thereof and determines whether a body of the driver faces a front side or is inclined to a left side or a right side. At this point, when the body of the driver is inclined to the left side or the right side, the driver posture detection sensor 120 senses how far the body is inclined to the left side or the right side on the basis of the front side. The driver posture detection sensor 120 generates posture data including information on a position of the driver, a body direction thereof, and the head height thereof and transmits the generated posture data to the calculator 130.

The calculator 130 may calculate display correction values of the display device 150 so as to improve visibility for the driver using the pupil position data and the posture data. The calculator 130 calculates a field of view of the driver on the basis of the pupil position data received from the driver pupil detection sensor 110 and the posture data received from the driver posture detection sensor 120. The field of view of the driver may include a position of the field of view thereof. The position of the field of view of the driver may include a relative position or an absolute position of the field of view of the driver.

Since a height, a body type, a posture, a face size, an interorbital width, and an eye shape are different for each person, a height, a body type, a posture, a face size, an interorbital width, and an eye shape of each of a plurality of people were learned in advance through a neural network algorithm such as deep learning, and learning result data for the driver was stored in a memory of the calculator 130. The calculator 130 calculates the position of the field of view of the driver using the learning result data for the body type, the posture, the face size, the interorbital width, and the eye shape of each of the plurality of people.

The calculator 130 may calculate the display correction values of the display device 150 using the field of view of the driver. The calculator 130 may calculate the display correction values of the display device 150 using the field of view of the driver, and current position values and tilted values of the display device 150 so as to improve visibility for the driver.

The calculator 130 calculates the display correction values of the display device 150 using position values of the field of view of the driver. The calculator 130 may calculate the display correction values of the display device 150 using the position values of the field of view of the driver, and the current position values and the tilted values of the display device 150.

The calculator 130 transmits the calculated display correction values to the display correction device 140. Here, a vertical tilt and a horizontal tilt of each of a plurality of display panels constituting the display device 150 may be adjusted using the display correction values. That is, the display correction values include data on how much the vertical tilt and the horizontal tilt of each of the plurality of display panels are adjusted.

The first camera module 160 is disposed inside or outside the vehicle so as to capture images of a front side ahead of the vehicle and captures the images of the front side ahead of the vehicle to generate front side image data. The front side image data generated in the first camera module 160 is transmitted to the display device 150.

The second camera module 170 is disposed inside or outside the vehicle so as to capture images of a rear side behind the vehicle and captures the images of the rear side behind the vehicle to generate rear side image data. The rear side image data generated in the second camera module 170 is transmitted to the display device 150.

The third camera module 180 is disposed inside or outside the vehicle so as to capture images of a rear left side beside the vehicle and captures the images of the rear left side beside the vehicle to generate rear left side image data. The rear left side image data generated in the third camera module 180 is transmitted to the display device 150.

The fourth camera module 190 is disposed inside or outside the vehicle so as to capture images of a rear right side beside the vehicle and captures the images of the rear right side beside the vehicle to generate rear right side image data. The rear right side image data generated in the fourth camera module 190 is transmitted to the display device 150.

Figure 2:
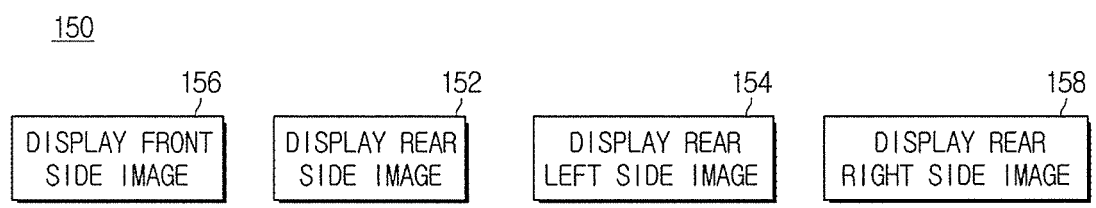
FIG. 2 is a diagram illustrating a display device shown in FIG. 1.

FIG. 2 is a diagram illustrating the display device 150 shown in FIG. 1.

Referring to FIG. 2, the display device 150 is disposed inside the vehicle, and as an example, the display device 150 may be embedded in a dashboard. The display device 150 includes a first display module 152, a second display module 154, a third display module 156, a fourth display module 158, and a drive circuit (not shown) configured to drive the first to fourth display modules 152, 154, 156, and 158.

The first display module 152 displays front side images ahead of the vehicle using the front side image data received from the first camera module 160.

The second display module 154 displays rear side images behind the vehicle using the rear side image data received from the second camera module 170.

The third display module 156 displays rear left side images beside the vehicle using the rear left side image data received from the third camera module 180.

The fourth display module 158 displays rear right side images beside the vehicle using the rear right side image data received from the fourth camera module 190.

Referring back to FIG. 1, the display correction device 140 adjusts a vertical tilt and a horizontal tilt of each of the first display module 152 configured to display the front side images, the second display module 154 configured to display the rear side images, the third display module 156 configured to display the rear left side images, and the fourth display module 158 configured to display the rear right side images on the basis of the received display correction values.

Figure 3:
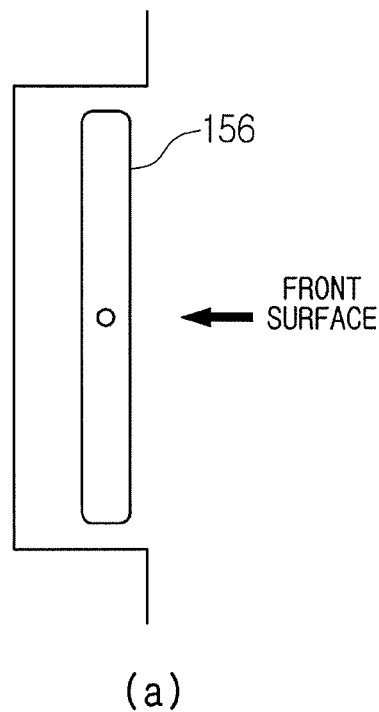
FIGS. 3 and 4 are diagrams illustrating a case in which a vertical tilt of each of a left side display panel and a right side display panel is adjusted.
Figure 3:
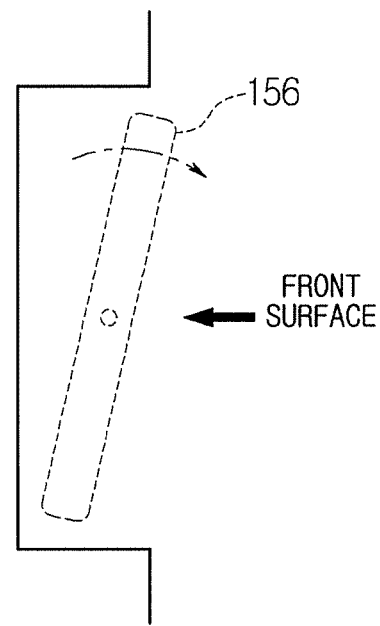
Figure 3:
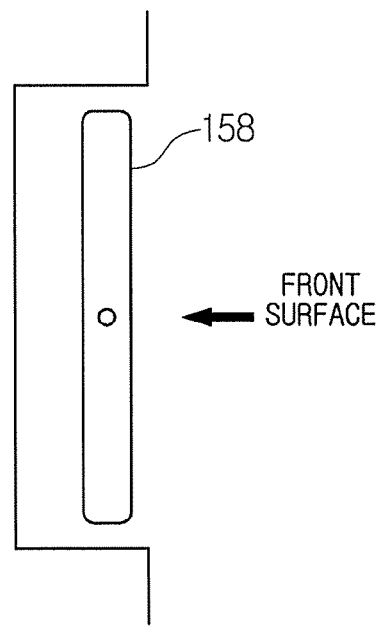
Figure 3:
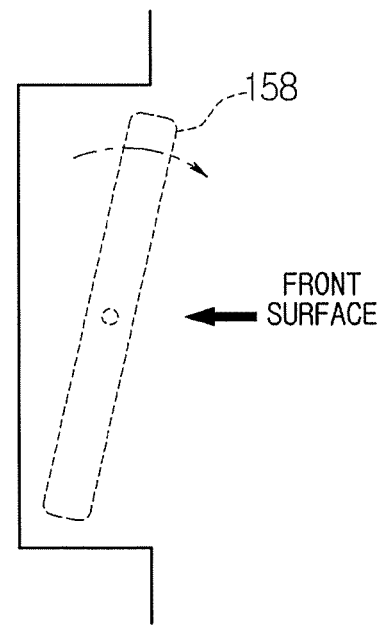
Figure 4:
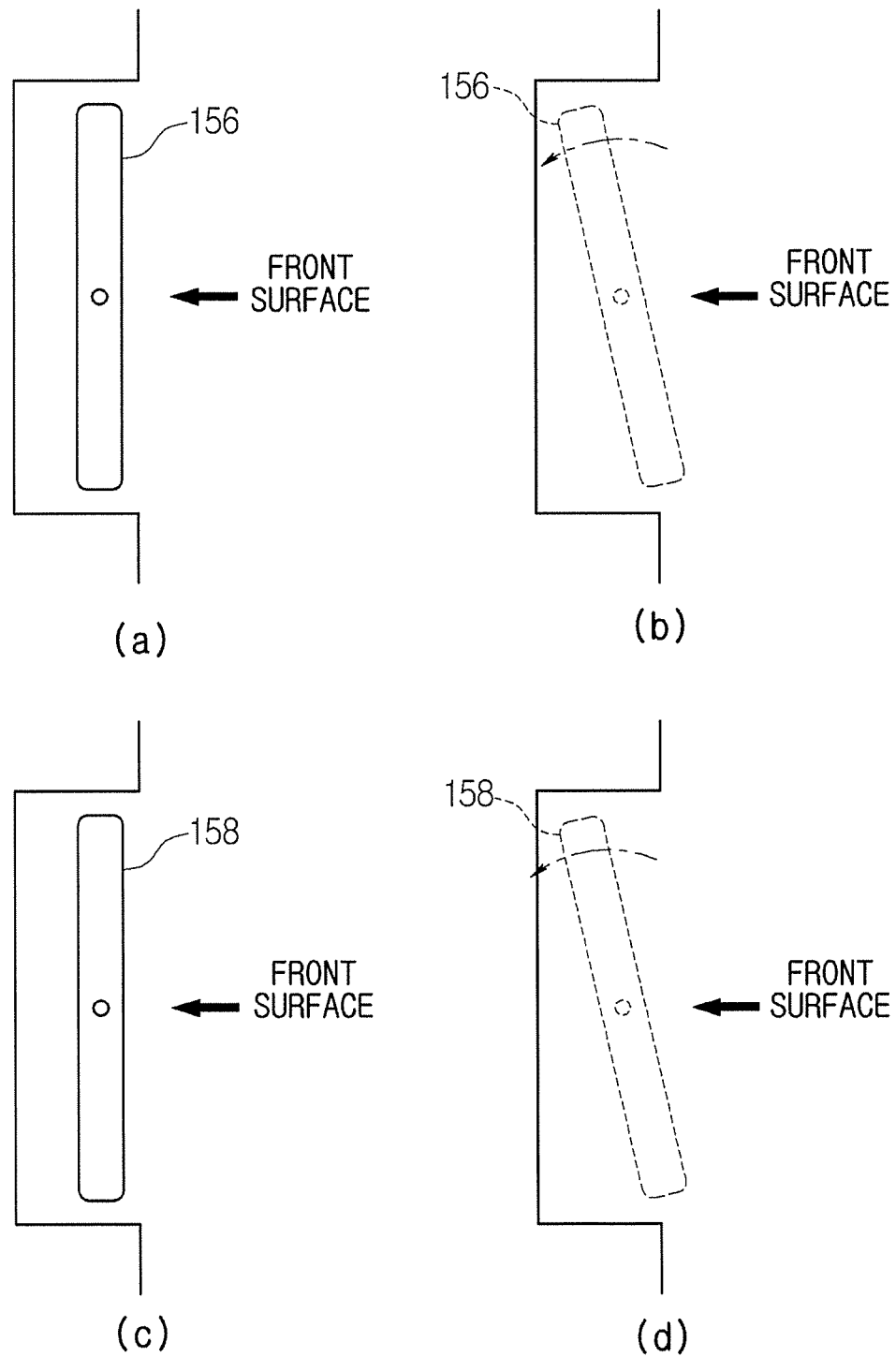

FIGS. 3 and 4 are diagrams illustrating a case in which a vertical tilt of each of a left side display panel and a right side display panel is adjusted. FIGS. 3 and 4 illustrate and describe an example in which a vertical tilt of each of the third display module 156 configured to display the rear left side images and the fourth display module 158 configured to display the rear right side images is adjusted.

Referring to FIG. 3, the display correction device 140 may adjust the vertical tilt of each of the third display module 156 configured to display the rear left side images and the fourth display module 158 configured to display the rear right side images in a downward direction (e.g., a negative direction) on the basis of the received display correction values.

The display correction device 140 may adjust the vertical tilt of the third display module 156 in the downward direction such that the third display module 156 shown in FIG. 3(*a*) may be adjusted to that shown in FIG. 3(*b*).

The display correction device 140 may adjust the vertical tilt of the fourth display module 158 in the downward direction such that the fourth display module 158 shown in FIG. 3(*c*) may be adjusted to that shown in FIG. 3(*d*).

Referring to FIG. 4, the display correction device 140 may adjust the vertical tilt of each of the third display module 156 configured to display the rear left side images and the fourth display module 158 configured to display the rear right side images in an upward direction (e.g., a positive direction) on the basis of the received display correction values.

The display correction device 140 may adjust the vertical tilt of the third display module 156 in the upward direction such that the third display module 156 shown in FIG. 4(a) may be adjusted to that shown in FIG. 4(b).

The display correction device 140 may adjust the vertical tilt of the fourth display module 158 in the upward direction such that the fourth display module 158 shown in FIG. 4(c) may be adjusted to that shown in FIG. 4(d).

Although not shown in FIGS. 3 and 4, the display correction device 140 may adjust the vertical tilt of each of the first display module 152 configured to display the front side images and the second display module 154 configured to display the rear side images on the basis of the received display correction values.

Figure 5:
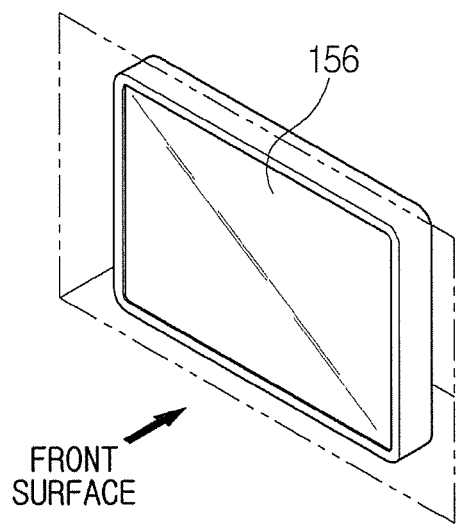
FIGS. 5 and 6 are diagrams illustrating a case in which a horizontal tilt of each of the left side display panel and the right side display panel is adjusted.
Figure 5:
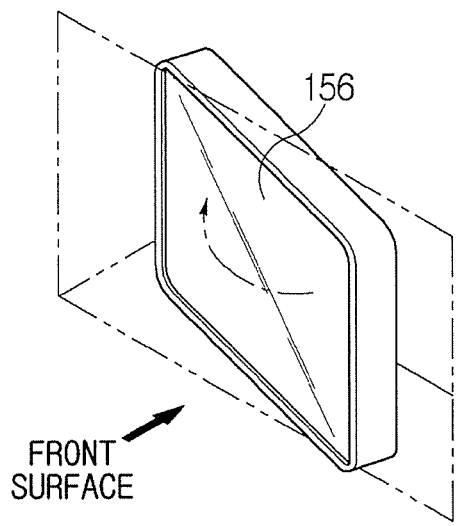
Figure 5:
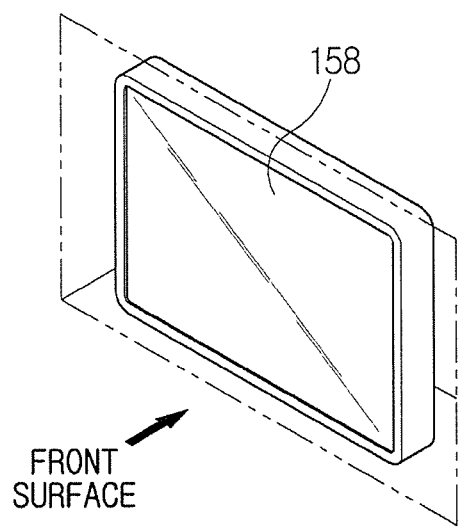
Figure 5:
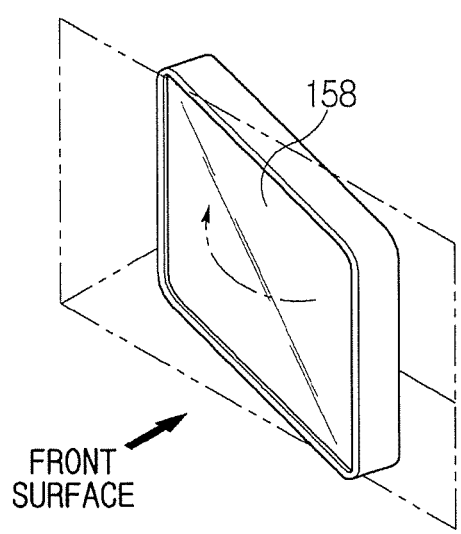
Figure 6:
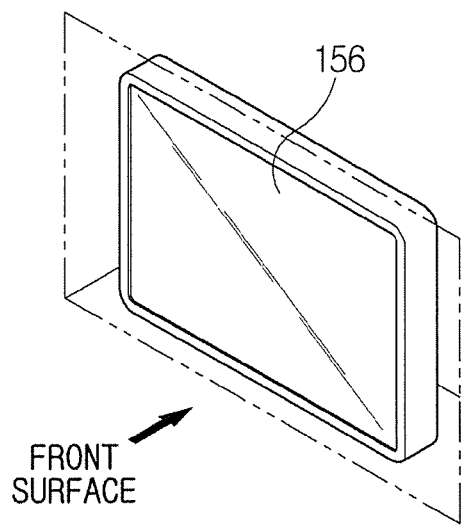
Figure 6:
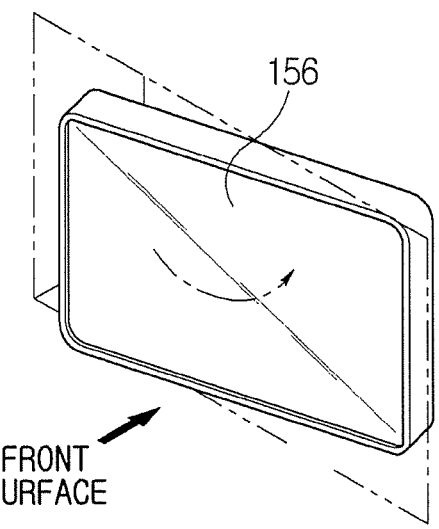
Figure 6:
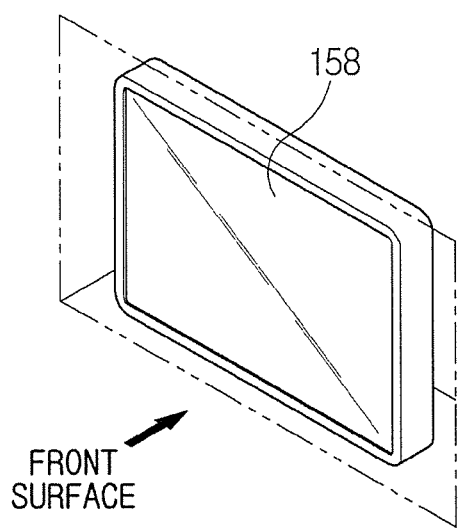
Figure 6:
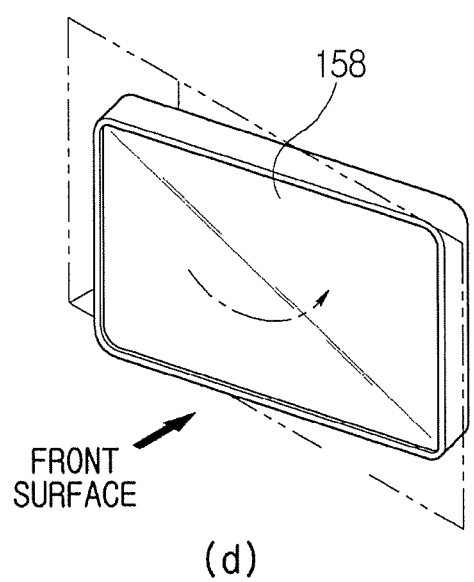

FIGS. 5 and 6 are diagrams illustrating a case in which a horizontal tilt of each of the left side display panel and the right side display panel is adjusted. FIGS. 5 and 6 illustrate and describe an example in which the horizontal tilt of each of the third display module 156 configured to display the rear left side images and the fourth display module 158 configured to display the rear right side images is adjusted.

Referring to FIG. 5, the display correction device 140 may adjust the horizontal tilt of each of the third display module 156 configured to display the rear left side images and the fourth display module 158 configured to display the rear right side images in a left direction (e.g., a negative direction) on the basis of the received display correction values.

The display correction device 140 may adjust the horizontal tilt of the third display module 156 in the left direction such that the third display module 156 shown in FIG. 5(a) may be adjusted to that shown in FIG. 5(b).

The display correction device 140 may adjust the horizontal tilt of the fourth display module 158 in the left direction such that the fourth display module 158 shown in FIG. 5(c) may be adjusted to that shown in FIG. 5(d).

Referring to FIG. 6, the display correction device 140 may adjust the horizontal tilt of each of the third display module 156 configured to display the rear left side images and the fourth display module 158 configured to display the rear right side images in a right direction (e.g., a positive direction) on the basis of the received display correction values.

The display correction device 140 may adjust the horizontal tilt of the third display module 156 in the right direction such that the third display module 156 shown in FIG. 6(a) may be adjusted to that shown in FIG. 6(b).

The display correction device 140 may adjust the horizontal tilt of the fourth display module 158 in the right direction such that the fourth display module 158 shown in FIG. 6(c) may be adjusted to that shown in FIG. 6(d).

Although not shown in FIGS. 5 and 6, the display correction device 140 may adjust the horizontal tilt of each of the first display module 152 configured to display the front side images and the second display module 154 configured to display the rear side images on the basis of the received display correction values.

As described above, the display system 100 of a vehicle according to the embodiment of the present disclosure automatically corrects the vertical tilt and the horizontal tilt of each of the plurality of display panels constituting the display device 150 according to the height of the driver, such that visibility of vehicle surroundings can be improved. Further, the display system 100 automatically corrects the vertical tilt and the horizontal tilt of each of the plurality of display panels constituting the display device 150 according to the posture of the driver, such that the visibility of the vehicle surroundings can be improved. Furthermore, the display system 100 automatically corrects the vertical tilt and the horizontal tilt of each of the plurality of display panels constituting the display device 150 according to the field of view of the driver, such that the visibility of the vehicle surroundings can be improved.

Figure 7:
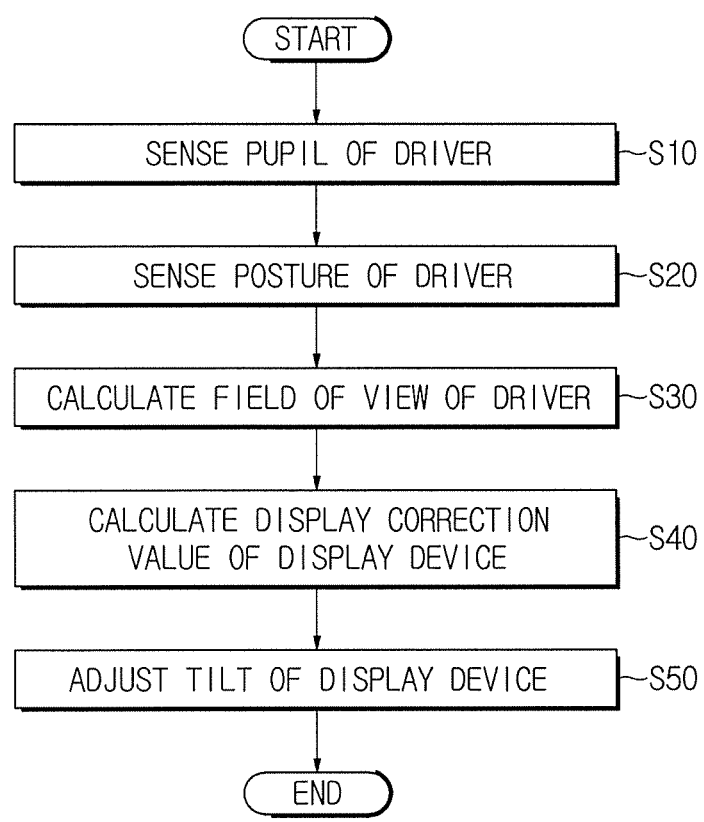
FIG. 7 is a flowchart illustrating a method of driving a display system of a vehicle according to an embodiment of the present disclosure.

FIG. 7 is a flowchart illustrating a method of driving a display system of a vehicle according to an embodiment of the present disclosure.

Referring to FIG. 7, a pupil of the driver is sensed through the driver pupil detection sensor 110 (operation 10). A camera may be applied as the driver pupil detection sensor 110, and the driver pupil detection sensor 110 may detect a position of the pupil by emitting infrared rays toward the pupil. Here, the driver pupil detection sensor 110 may detect each of positions of left and right pupils of the driver and generate pupil position data of the driver. The driver pupil detection sensor 110 transmits the pupil position data to the calculator 130.

Subsequently, a weight of the driver is detected through the driver posture detection sensor 120, and the posture of the driver is determined according to the weight detected by the plurality of weight detection sensor 120 disposed at different location in the driver seat. Further, the camera sensor constituting the driver posture detection sensor 120 captures the driver sitting in the driver seat, and then the driver posture detection sensor 120 senses a head height of the driver and a sitting height thereof and estimates whether a body of the driver faces a front side or is inclined to a left side or a right side to sense a posture of the driver (operation 20).

At this point, when the body of the driver is inclined to the left side or the right side, the driver posture detection sensor 120 senses how far the body is inclined to the left side or the right side on the basis of the front side. The driver posture detection sensor 120 generates posture data of the driver including information on the posture of the driver, a body direction thereof, and the head height thereof, and transmits the generated posture data to the calculator 130.

Subsequently, the calculator 130 calculates a field of view of the driver on the basis of the pupil position data received from the driver pupil detection sensor 110 and the posture data received from the driver posture detection sensor 120 (operation 30).

Here, the calculator 130 calculates the field of view of the driver using learning result data for a body type, a posture, a face size, an interorbital width, and an eye shape of each of a plurality of people.

Next, the calculator 130 calculates display correction values using the field of view of the driver (operation 40).

Then, the calculator 130 transmits the calculated display correction values to the display correction device 140. Here, a vertical tilt and a horizontal tilt of each of a plurality of display panels constituting the display device 150 may be adjusted using the display correction values. That is, the display correction values include data on how much the vertical tilt and the horizontal tilt of each of the plurality of display panels are adjusted.

Subsequently, the display correction device 140 adjusts the vertical tilt and the horizontal tilt of each of the first display module 152 configured to display front side images, the second display module 154 configured to display rear side images, the third display module 156 configured to display rear left side images, and the fourth display module 158 configured to display rear right side images on the basis of the received display correction values (operation 50).

As shown in FIGS. 3 and 4, the display correction device 140 may adjust the vertical tilt of each of the third display module 156 configured to display the rear left side images and the fourth display module 158 configured to display the rear right side images in a downward direction (e.g., a negative direction) or an upward direction (e.g., a positive direction) on the basis of the received display correction values.

As shown in FIGS. 5 and 6, the display correction device 140 may adjust the horizontal tilt of each of the third display module 156 configured to display the rear left side images and the fourth display module 158 configured to display the rear right side images in a left direction (e.g., a negative direction) or a right direction (e.g., a positive direction) on the basis of the received display correction values.

As described above, the method of driving a display system of a vehicle according to the embodiment of the present disclosure automatically corrects the vertical tilt and the horizontal tilt of each of the plurality of display panels constituting the display device 150 according to a state of the driver such as the height of the driver, the position thereof, the field of view thereof, and the like, such that visibility of vehicle surroundings can be improved.

As is apparent from the above description, the vertical tilt and the horizontal tilt of the display device can be automatically corrected according to a height of a driver such that visibility of vehicle surroundings can be improved.

Further, in accordance with the embodiments of the present disclosure, the vertical tilt and the horizontal tilt of the display device can be automatically corrected according to a position of the driver such that the visibility of the vehicle surroundings can be improved.

Furthermore, in accordance with the embodiments of the present disclosure, the vertical tilt and the horizontal tilt of the display device can be automatically corrected according to a field of view of the driver such that the visibility of the vehicle surroundings can be improved.

Those skilled in the art to which the present disclosure pertains will appreciate that specific other forms can be devised without departing from the technical spirit or essential feature of the present disclosure such that the above-described embodiments should be construed as illustrative rather than determinative in all aspects thereof. The scope of the present disclosure is defined by the appended claims rather than the above detailed description, and it should be construed that all alternations and modifications derived from the meanings, ranges, and equivalents of the claims will fall within the scope of the present disclosure.

In one or more exemplary embodiments, the described functions may be implemented in hardware, software, firmware, or any combination thereof. When implemented in software, these functions may be stored in or transmitted to a computer-readable medium as one or more commands or codes. The computer-readable media includes both a communication medium and a storage medium which include any medium that facilitates transfer of a computer program from one place to another. The storage medium may be any usable medium which is accessible by a computer. As an example rather than a limitation, such computer-readable medium may include a random access memory (RAM), a read only memory (ROM), an electrically erasable and programmable read only memory (EEPROM), a compact disc read only memory (CD-ROM), other optical disk storage, a magnetic disk storage, other magnetic storage devices, or any other medium which can be used to transmit or store a desired program code in a form of a command or a data structure, and be accessible by a computer. Also, any connection is properly referred to as a computer-readable medium. For example, when software is transmitted from a web site, a server, or other remote source using a coaxial cable, an optical fiber cable, a twisted pair cable, a digital subscriber line (DSL), or wireless techniques using infrared, radio, and ultra-high frequencies, the definition of a computer-readable medium includes the coaxial cable, the optical fiber cable, the twisted pair cable, the DSL, or the wireless techniques such as infrared, radio, and ultra-high frequencies. Disks and discs as used herein include a compact disc (CD), a laser disc, an optical disc, a digital versatile disc (DVD), a floppy disk, and a blue-ray disc, and the disks magnetically reproduce data while the discs optically reproduce data. A combination of the above-described disks and discs should also be included within the scope of the computer-readable medium.

When the embodiments are implemented in a program code or code segments, the code segment should be recognized to represent a procedure, a function, a subprogram, a program, a routine, a subroutine, a module, a software package, a class, commands, data structures, or any combination of program instructions. The code segment may be connected to another code segment or a hardware circuit by transmitting and/or receiving information, data, arguments, parameters, or memory contents. The information, the arguments, the parameters, and the data may be delivered, sent, or transmitted using any suitable means including a memory sharing, a message passing, a token passing, network transmission, and the like. Alternatively, in terms of certain aspects, steps and/or operations of a method or an algorithm may reside on a machine-readable medium and/or a computer-readable medium, which is/are integratable as a computer program object, as one of codes and/or commands, or any combination or set of the codes and/or the commands.

In a software implementation, the techniques described herein may be implemented with modules (for example, procedures, functions, and the like) which perform the functions described herein. Software codes may be stored in memory units and be executed by processors. The memory units may be internally or externally implemented in the processor, and in this case, the memory units may be communicatively connected to the processor by various known means.

In a hardware implementation, processing units may be implemented in one or more application specific integrated circuits (ASICs), digital signal processors (DSPs), digital signal processing devices (DSPDs), programmable logic devices (PLDs), field programmable gate arrays (FPGAs), processors, controllers, micro controllers, microprocessors, other electronic units designed to perform the above-described functions, or a combination thereof.

The foregoing includes examples of one or more embodiments. Since it is impossible to describe all possible combinations of components or methods for purposes of describing the above-described embodiments, those skilled in the art will recognize that many additional combinations and substitutions of various embodiments are possible. Therefore, the above-described embodiments include all alterations, modifications, and reformations which fall within the spirit and scope of the appended claims. Further, to the extent in that the term "including" is used in the detailed description or the claims, such a term is intended to be inclusive in a manner similar to that the term "comprising" is construed as a transitional word when used in the claims.

Furthermore, as used in this application, the terms "component," "module," "system," and the like include computer-related entity such as hardware, firmware, a combination of hardware and software, software, or software being executed, but the terms are not limited thereto. For example, the component may be a process running on a processor, a processor, an object, an executable execution thread, a program, and/or a computer, but the component is not limited thereto. For example, both of a computing device and application running on the computing device may be components. One or more components may reside within a process and/or an execution thread, and the components may be centralized on a single computer and/or distributed between two or more computers. Further, these components may be executed from various computer-readable medium storing various data structures. The components may be communicated by a local and/or remote process according to a signal having one or more data packets (e.g., data sent from any component and interacting with other system via a network such as the Internet by other component and/or a signal of a local system or a distributed system).

What is claimed is:

1. A display system of a vehicle, comprising:
    a plurality of camera modules configured to capture a front side, a rear side, a rear left side, and a rear right side relative to the vehicle and generate image data;
    a plurality of display panels configured to receive the image data and display a front side image, a rear side image, a rear left side image, and a rear right side image relative to the vehicle;
    a driver pupil detection sensor configured to sense a pupil of a driver and generate pupil position data;
    a driver posture detection sensor comprising a weight distribution sensor and configured to sense a position of the driver, a body direction thereof, and a head height thereof and generate posture data;
    a calculator configured to calculate a position of a field of view of the driver on the basis of the pupil position data, the posture data, and an interorbital width, and generate a display correction value on the basis of the position of the field of view; and
    a display correction device configured to adjust a horizontal tilt and a vertical tilt of each of the plurality of display panels on the basis of the display correction value,
    wherein the driver posture detection sensor is configured to sense how far a body of the driver is inclined to a left side or a right side,
    the display correction value is generated on the basis of how far the body of the driver is inclined to the left side or the right side, and
    the display correction device further adjusts the horizontal tilt of each of the plurality of display panels in a left direction or a right direction on the basis of the display correction value.

2. The system of claim 1, wherein the plurality of display panels includes:
    a first display panel configured to display the front side image relative to the vehicle;
    a second display panel configured to display the rear side image relative to the vehicle;
    a third display panel configured to display the rear left side image relative to the vehicle; and
    a fourth display panel configured to display the rear right side image relative to the vehicle.

3. The system of claim 2, wherein the display correction device adjusts a vertical tilt of each of the first to fourth display panels in an upward direction or a downward direction on the basis of the display correction value.

4. The system of claim 1, wherein the calculator includes a memory configured to store driver learning result data, which is obtained by learning a height, a body type, a posture, a face size, the interorbital width, and an eye shape of each of a plurality of people, and calculates an absolute position of the field of view of the driver on the basis of the learning result data.

5. The system of claim 1, wherein the driver pupil detection sensor comprises an image sensor disposed to face the driver, and the weight distribution sensor comprises a plurality of weight detection sensors disposed at different locations in a driver seat to determine a weight distribution of the driver.

6. A display system of a vehicle, comprising:
    a camera module configured to capture vehicle surroundings;
    a display panel configured to display an image captured through the camera module;
    a driver pupil detection sensor configured to sense a pupil of a driver;
    a driver posture detection sensor configured to sense a posture of the driver;
    a calculator configured to calculate a display correction value of the display panel on the basis of a position of a field of view of the driver determined based on the sensed pupil of the driver, an interorbital width, and the sensed posture of the driver; and
    a display correction device configured to adjust a horizontal tilt and a vertical tilt of the display panel according to the calculated display correction value,
    wherein the driver posture detection sensor is configured to sense how far a body of the driver is inclined to a left side or a right side,
    the display correction value is calculated on the basis of how far the body of the driver is inclined to the left side or the right side, and
    the display correction device further adjusts the tilt of the display panel in a left direction or a right direction on the basis of the display correction value.

7. The display system of claim 6, wherein the driver pupil detection sensor comprises an image sensor disposed to face the driver, and the driver posture detection sensor comprises a weight detection sensor.

8. The display system of claim 7, wherein the driver posture detection sensor comprises a plurality of weight detection sensors disposed at different locations in a driver seat to determine a weight distribution of the driver.

9. A method of driving a display system of a vehicle, comprising:
    sensing a pupil of a driver and generating pupil position data;
    sensing a weight distribution of the driver in a driver seat, a body direction thereof, and a head height thereof and generating driver posture data;
    calculating a position of a field of view of the driver on the basis of the pupil position data, the driver posture data, and an interorbital width;
    generating a display correction value on the basis of the position of the field of view of the driver; and
    adjusting a horizontal tilt and a vertical tilt of each of a plurality of display panels disposed at the vehicle on the basis of the display correction value,
    wherein the sensing comprises sensing how far a body of the driver is inclined to a left side or a right side, the display correction values are generated on the basis of how far the body of the driver is inclined to the left side or the right side, and the adjusting comprises adjusting the horizontal tilt of each of the plurality of display panels in a left direction or a right direction on the basis of the display correction value.

10. The method of claim 9, further comprising adjusting the vertical tilt of each of the plurality of display panels in an upward direction or a downward direction on the basis of the display correction value.

11. The method of claim 9, further comprising:

storing driver learning result data, which is obtained by learning a height, a body type, a posture, a face size, the interorbital width, and an eye shape of each of a plurality of people, in a memory; and calculating an absolute position of the field of view of the driver on the basis of the driver learning result data.

12. The method of claim 9, wherein the sensing the pupil of the driver comprises detecting a position of the pupil using an image sensor disposed to face the driver, and the sensing the weight distribution of the driver comprises detecting weights at a plurality of different locations in the driver seat to determine the weight distribution of the driver.

* * * * *